(12) United States Patent
Svensson

(10) Patent No.: US 6,789,295 B1
(45) Date of Patent: Sep. 14, 2004

(54) CLAMP APPARATUS

(75) Inventor: Gerhard Svensson, Alingsås (SE)

(73) Assignee: Amicus Trade AB (SE)

( * ) Notice: Subject to any disclaimer, the term of this patent is extended or adjusted under 35 U.S.C. 154(b) by 0 days.

(21) Appl. No.: 09/762,884

(22) PCT Filed: Aug. 18, 1999

(86) PCT No.: PCT/SE99/01390
§ 371 (c)(1),
(2), (4) Date: Feb. 14, 2001

(87) PCT Pub. No.: WO00/11352
PCT Pub. Date: Mar. 2, 2000

(30) Foreign Application Priority Data

Aug. 21, 1998 (SE) .............................. 9802810

(51) Int. Cl.⁷ .......................... F16G 11/04; F16G 11/00
(52) U.S. Cl. ................. 24/115 M; 24/136 R; 24/136 L
(58) Field of Search .......................... 24/115 R, 115 M, 24/129 B, 130, 136 K, 136 L, 136 M, 477, 459–462, 522, 526–528; 403/374.1–374.5, 49, 109.5, 211, 281, 314, 367

(56) References Cited

U.S. PATENT DOCUMENTS

| 731,383 | A | * | 6/1903 | McHale | 279/97 |
| 1,006,895 | A | * | 10/1911 | Albree | 279/97 |
| 1,023,706 | A | | 4/1912 | Anderson | |
| 1,332,442 | A | | 3/1920 | Kane | |
| 1,407,344 | A | * | 2/1922 | West | 24/522 |
| 1,474,692 | A | * | 11/1923 | Thurau | 24/600.4 |
| 2,025,332 | A | * | 12/1935 | Bullum | 24/136 R |
| 2,125,540 | A | * | 8/1938 | Carlson | 24/477 |
| 2,260,378 | A | * | 10/1941 | Hoffland | 24/194 |
| 2,685,848 | A | * | 8/1954 | Meighan et al. | 24/526 X |
| 2,866,249 | A | * | 12/1958 | Normandin | 24/460 |
| 3,654,672 | A | * | 4/1972 | Bullar | 24/136 K |
| 3,785,003 | A | * | 1/1974 | Thomson | 24/462 X |
| 3,960,461 | A | | 6/1976 | Sachs | 403/368 |
| 4,066,368 | A | * | 1/1978 | Mastalski et al. | 24/115 M |
| 4,313,243 | A | * | 2/1982 | Childress et al. | 24/136 K |
| 4,686,748 | A | | 8/1987 | Kaivanto | 24/522 |
| 4,809,408 | A | * | 3/1989 | Abrahamson | 24/136 K |
| 5,178,306 | A | * | 1/1993 | Petrou | 24/477 X |
| 5,336,846 | A | * | 8/1994 | Sachs | 24/136 K |
| 5,544,395 | A | | 8/1996 | Rosenvinge | 24/460 |
| 5,692,272 | A | | 12/1997 | Woods | 24/459 |

FOREIGN PATENT DOCUMENTS

| GB | 2 215 766 A | * | 9/1989 | 24/460 |
| JP | 406094010 A | * | 4/1994 | 403/374.4 |

* cited by examiner

Primary Examiner—Robert J. Sandy
Assistant Examiner—Ruth C. Rodriguez
(74) Attorney, Agent, or Firm—Orum & Roth

(57) ABSTRACT

The invention relates to a clamp apparatus for application to an object, for example a plate, a sheet, a fabric or a thin film, by gripping two opposite sides of the object. For this purpose, the apparatus comprises a tubular element with an inner passage with a cross section which tapers in the direction of one end of the element and a clamp surface projecting from the opposite end of the element. A wedge shaped element with a tapering section is insertable into the passage via its wide opening. Thereby, a nip is formed in the co-operation between the wedge shaped element and the clamp surface.

14 Claims, 1 Drawing Sheet

CLAMP APPARATUS

TECHNICAL FIELD

The present invention relates to a clamp apparatus for application to an object, for example a plate, a sheet, a fabric or a thin film, by gripping two opposite sides of the object.

STATE OF THE ART

Clamps according to the above may for example be used for holding tarpaulins, e.g. in places where a tarpaulin is not equipped with fastening eyelets. A holding means which is intended for this object is known from SE 465057 and comprises a flat, conically shaped sheet metal wedge which co-operates with two opposite, mutually converging side legs on a flat buckle. This prior art holding means forms a clamp hold with comparatively sharp edges against a small surface of the tarpaulin cloth which stands a risk of being damaged when the pull force is large. Also, this prior art fastening apparatus is not suitable for a thick cloth material like rubber cloth.

SUMMARY OF THE INVENTION

One object of the present invention is therefore to provide a holding means which is less harmful to the cloth material and which also may be used for thick cloth materials.

For this object, the clamp apparatus according to the invention comprises a tubular element with an inner passage with a cross section which tapers in the direction of one end of the element and a clamp surface projecting from the opposite end of the element, and a wedge shaped element with a tapering section which is insertable into the passage via its wide opening, thereby forming a nip in co-operation with the clamp surface.

According to one advantageous embodiment of the invention, the passage has a substantially rectangular cross section. The clamp surface may form an extension of one of the sides of the rectangular passage.

The clamp surface is preferably grooved, and both the tubular element and the wedge shaped element may be manufactured from a plastic material.

BRIEF DESCRIPTION OF THE DRAWINGS

The invention will be further described in the following, in a non-limiting way with reference to the accompanying drawings in which.

DETAILED DESCRIPTION OF THE INVENTION

Figure 1:
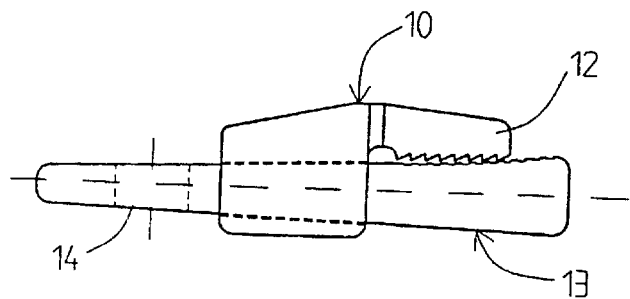
FIG. 1 shows a clamp diagrammatically in a side view which clamp is designed in accordance with the invention.
Figure 2:
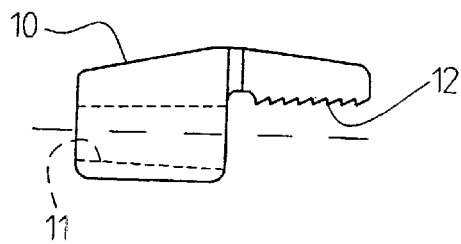
FIG. 2 shows the tubular element of the clamp in a side view.
Figure 3:
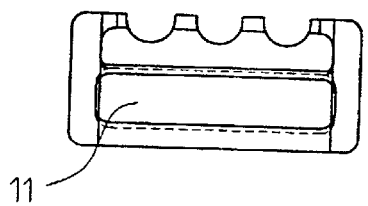
FIG. 3 is an end view of the tubular element.
Figure 4:
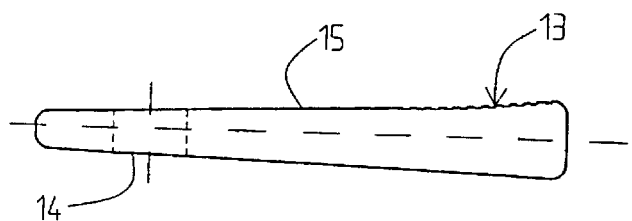
FIG. 4 shows the wedge shaped element of the clamp in a side view.

The clamp apparatus shown in FIGS. 1 to 4 comprises a tubular element 10 with an inner passage 11. This passage 11 is provided with a cross section which tapers in the direction of the left (in FIG. 1) end of the element. A clamp surface 12 projects from the opposite end of the element 10. The clamp surface is grooved for increased friction.

A wedge shaped element 13 is provided with a tapering cross section and is insertable into the passage 11 (see FIG. 1) via its wide opening and thereby forming a nip in co-operation with the clamp surface 12. The pointed end of the wedge shaped element is provided with a hole opening 14 which makes it possible to apply a not shown drawstring, for example a line in this end. The thickness of the wedge shaped element prevents it from being passed through the passage 11. The wedge shaped element is provided with a concave clamp surface 15 which is grooved.

A cloth material is entered into the nip between the tubular element 10 and the wedge shaped element 13. Then the cloth is clamped fast in this nip, by the application of a pulling force to the clamp. The cloth is now firmly held between two wide flat surfaces which are not inclined to damage the cloth material. The more pulling force being applied, the more efficiently the cloth material is clamped fast in a lenient manner. The grooves of the clamp surface 12 contributes to this, and to that the nip is maintained, even if the pulling force would be reduced temporarily. The clamp apparatus is simple to dimension with reference to occurring load and to the elasticity and thickness of the cloth material.

The above described clamp may be used for hanging objects, e.g. curtains or signs, or for handling sheet metal or other plate material.

The invention is not limited to the above described embodiment, but several variants are imaginable within the scope of the accompanying claims. For example, the wedge shaped element may be designed for different types of pulling means, e.g. in the manner of a handle.

What is claimed is:

1. A clamp apparatus for application to a sheet-shaped object by gripping two opposite sides of the object, characterized in a tubular element (10) with an inner passage (11) and a clamp surface (12) projecting from the opposite side of the element, and a wedge shaped element (13) with a tapering section which is insertable into the passage (11) [via its wide opening], thereby forming a nip in cooperation with the clamp surface (12), said wedge shaped element being provided with a hole opening (14) for a drawstring so that the wedge shaped element is subjected to a substantially continuous pulling force when an object is entered into the nip, said pulling force being directed away from the object in the direction of said drawstring;

wherein the passage (11) has a substantially rectangular cross-section and the clamp surface (12) forms an extension of one of the sides of the rectangular passage (11).

2. A clamp apparatus according to claim 1, wherein said inner passage has a cross section which tapers in the direction of one end of the element.

3. The clamp apparatus of claim 1 wherein said object is clamped in said nip.

4. The clamp apparatus of claim 1 wherein said object is clamped between the clamp surface and the wedged shaped element.

5. The clamp apparatus of claim 1 wherein said object is clamped on two opposite sides by said clamp apparatus.

6. A clamp apparatus according to claim 1, characterized in that the wedge shaped element (13) is provided with a concave clamp surface (15).

7. A clamp apparatus according to claim 6, characterized in that the clamp surface (15) of the wedge shaped element (13) is grooved.

8. A clamp apparatus according to claim 1, characterized in that both the tubular element and the wedge shaped element (10, 13) are manufactured from a plastic material.

9. A clamp apparatus according to claim 8, characterized in that the wedge shaped element (13) is provided with a concave clamp surface (15).

10. A clamp apparatus according to claim 9, characterized in that the clamp surface (15) of the wedge shaped element (13) is grooved.

11. A clamp apparatus according to claim 1, characterized in that the clamp surface (12) is grooved.

12. A clamp apparatus according to claim 11, characterized in that both the tubular element and the wedge shaped element (10, 12) are manufactured from a plastic material.

13. A clamp apparatus according to claim 11, characterized in that the wedge shaped element (13) is provided with a concave clamp surface (15).

14. A clamp apparatus according to claim 13, characterized in that the clamp surface (15) of the wedge shaped element (13) is grooved.

* * * * *